July 15, 1941.  K. BIHL ET AL  2,249,414
IRON GONIOMETER
Filed Dec. 8, 1937
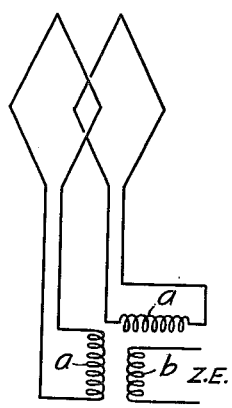
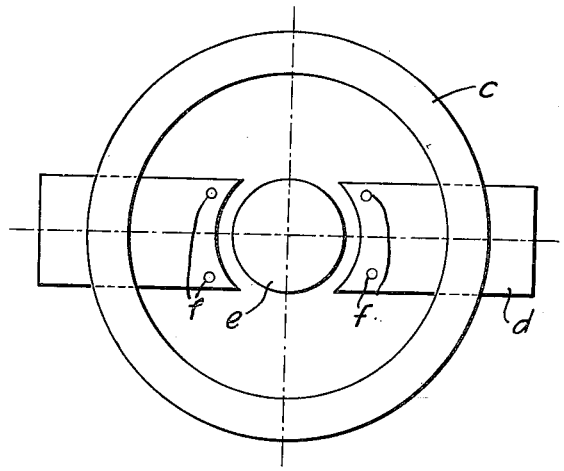
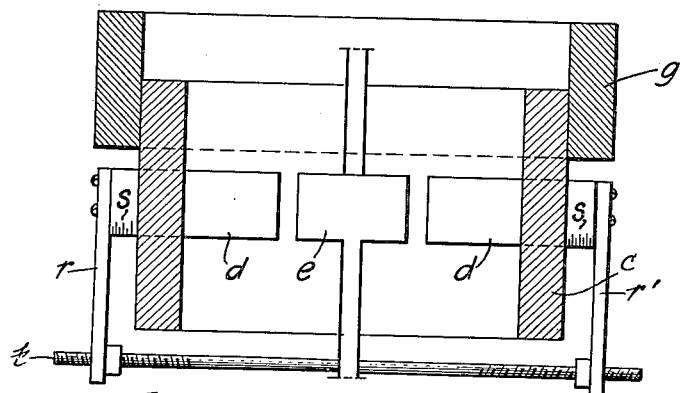
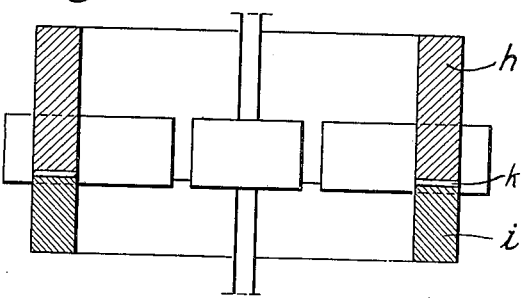
INVENTORS
KONRAD BIHL
PAUL HERMANSPANN
BY
H. S. Grover
ATTORNEY Patented July 15, 1941

2,249,414

UNITED STATES PATENT OFFICE 2,249,414

IRON GONIOMETER

Konrad Bihl, Berlin, and Paul Hermanspann, Leipzig, Germany, assignors to Telefunken Gesellschaft fur Drahtlose Telegraphie m. b. H., Berlin, Germany, a corporation of Germany Application December 8, 1937, Serial No. 178,694
In Germany September 24, 1936

1 Claim. (Cl. 250—11)

This invention relates to an arrangement for the compensation of angle or quadrantal errors in iron goniometers.

In the operation and use of goniometer devices, as well known in the art, the field set up by a distant transmitter at a certain receiving point is reproduced by separate supply of two field components at right angles to each other, the latter being thereupon re-assembled in the goniometer to result in a resultant field. Fig. 1 shows a device of the said sort comprising the field coils $a$ and the search coil $b$ which are in coupling relation with a direction finder receiver Z. E. Fig. 2 shows diagrammatically an end view of the core structure of my improved goniometer. Figures 3 and 4 show cross-sectional views of modifications of the core structure of my invention.

The construction and mounting of an iron goniometer corresponds to that of a two-pole D. C. machine. Each pole shoe carries one-half of a search coil winding, both halves being connected in series. The rotor supports the two field coils staggered an angle of 90 degrees in reference to each other.

While the air-gap between the rotor and each pole-shoe is at least 1 millimeter, it is enlarged in the direction of the pole horns or tips in order that a sinusoidal coupling may be obtained between the field coils and the search coil. Hence, by choosing an appropriate form for the pole-shoes it is possible to make the field sinusoidal in the air-gap and thus attain in the iron of the rotor homogeneous field distribution. This condition must be absolutely fulfilled in iron goniometers since lack of homogeneousness of the field is conducive to quadrantal errors or angular errors.

Now, with a single goniometer the true angle is actually obtainable by choosing a proper shape for the pole shoes, for a definite size of the air-gap. A certain size once ascertained experimentally for the gap would thus have to be adopted in large-scale manufacture. But this is attended with serious difficulties. In industrial production there will always appear deviations from the desired size of the air-gap, from the variation in permeability in the kind of iron that is used, and in the arrangement of the windings. This naturally would result in fairly appreciable errors of angle.

Now, according to the invention arrangements to compensate angular errors in iron goniometers are to be made so that a shift of the pole-shoes will result in a change in the field distribution in the air-gap to thereby establish a sinuous field distribution in the air-gap. In this manner the effect of all factors or sources conducive to quadrantal errors may be neutralized.

Figs. 2 and 3 illustrate a goniometer comprising the outer ring $c$, adjustable pole-shoes $d$ and the rotor $e$. The pole-shoes $d$ are arranged to be shifted in contrary sense by means of a worm $t$ with right- and left-hand screw thread engaging in threaded carriers $r, r'$ attached to the pole shoes $d$ in any suitable manner; or else they may be set separately, the position of the pole-shoes symmetric to the rotor being ascertained by observation by means of setting scales $s, s$. The scales are also useful as a setting guide when the worm $t$ is used.

Another scheme would be to provide the pole-shoes (for instance, the pole tips) in axial sense of the goniometer with one or several bores $f$, and into these bore-holes pins or pegs of a material having a different permeability than the iron of the pole shoes may be screwed for the purpose of insuring a balanced condition.

However, such a change in the field distribution results at the same time in an alteration in the inductance of the search coil, and this means detuning of the receiver. Thus, according to a further object of the invention, the ensuing change in inductance is compensated for by the shifting of an iron dust-core cylinder $g$ upon the outer ring $c$ (Fig. 3). In the scheme of Fig. 4 the said balance is obtained by dividing the outer ring into two rings $h$ and $i$. By variation of the air-gap $k$ between $h$ and $i$, balance of inductance is insured.

We claim:

An iron goniometer having a rotatable iron armature, an outer iron ring arranged coaxially with respect to said armature, a plurality of pole pieces substantially surrounding said armature and passing through said outer ring, said pole pieces being movable radially whereby the field distribution in the air gap around said armature may be varied and a second magnetic ring surrounding said outer ring and movable axially thereover whereby the change in inductance occasioned by the variation in field distribution is compensated for.

KONRAD BIHL.
PAUL HERMANSPANN.